March 31, 1931.  J. E. BADGLEY  1,798,716
ATTACHMENT FOR WHEELS
Filed Nov. 16, 1929
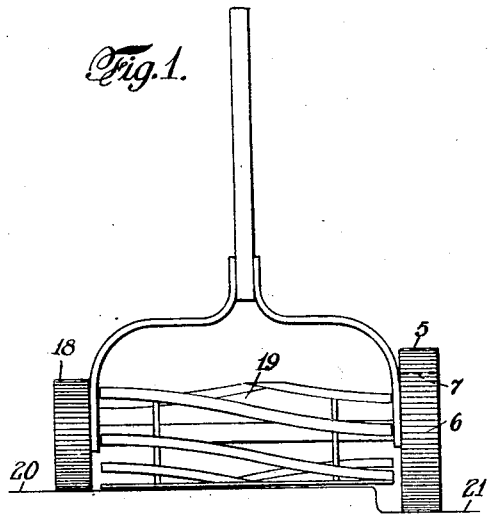
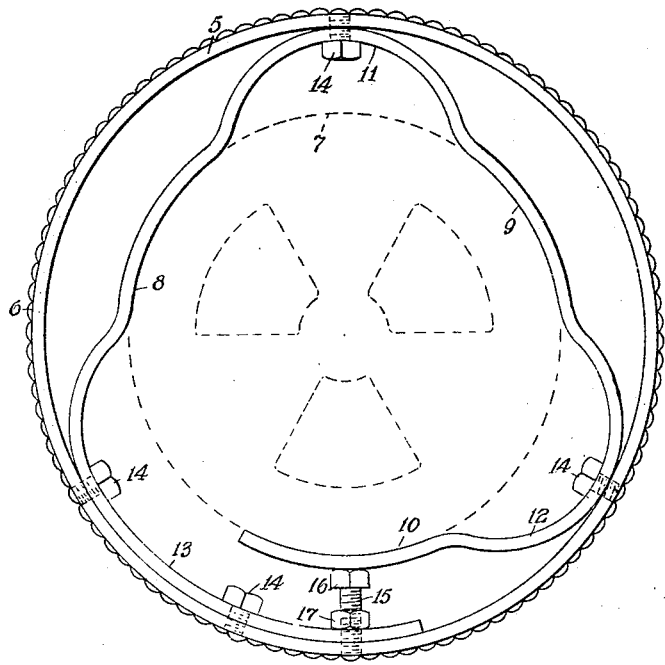
INVENTOR
JARVIS E. BADGLEY
BY
ATTORNEY Patented Mar. 31, 1931

1,798,716

UNITED STATES PATENT OFFICE

JARVIS E. BADGLEY, OF CRANFORD, NEW JERSEY

ATTACHMENT FOR WHEELS

Application filed November 16, 1929. Serial No. 407,677.

This invention relates to devices for attachment to wheels and has for an object to enlarge the diameter of a wheel, and in some instances to provide a surface on the rim different from that with which it is provided.

One application of the invention is for enlarging one wheel of a lawn mower so that the machine as a whole may remain practically level when cutting the edges of paths or around shrub or flower beds, etc. The wheel to which the attachment is applied will run on the path or lower surface, the normal wheel remaining on the lawn.

One practicable form of my invention is illustrated in the accompanying drawings, in which Fig. 1 is a schematic view representing in part the front elevation of a lawn mover equipped with my improvement, and Figure 2 shows an end elevation of the device detached from the wheel, the wheel, however, being illustrated in dotted lines.

In the illustration the outer rim 5 is preferably endless or continuous, and while resilient to a certain extent is substantially inexpansible.

The preferred form of my invention being for the purpose of enlarging one of the wheels of a lawn mower, the invention will be described in reference to lawn mowers. The outer surface of this rim 5 may be undulated as at 6 for the purpose of giving a better tractive engagement with the surface over which this is to be run.

Resilient and adjustable means are provided inside the rim 5 for engaging the outer perimeter of the ordinary wheel to which it is to be applied, in the illustration the lawn mower wheel 7 shown in Fig. 2 and illustrated in dotted lines in Figure 1. The exact shape and dimensions of this resilient member will vary in accordance with the uses to which the attachment is to be applied, and when used on a lawn mower the difference in radius between the outer surface of the rim 5 and the outer surface of the rim 7 upon which it is contemplated to be used will be determined by the amount of drop which is prevalent in the lawns upon which the mower is intended for use. The resilient attaching means is shown as comprising a band of metal bent into portions 8, 9 and 10 for engaging the outer periphery of the wheel 7 and into portions 11, 12 and 13 for engaging the inner side of the rim 5. At the outward bends 11 and 12 the band is securely attached to the rim. In the illustrated form screws 14 are employed for this purpose, there being one of these screws 14 for holding each of the bends 11 and 12 in position, and two of the screws 14 for holding the portion 13 which preferably is the end of the band and extends along the inside of the rim 5 for a considerable distance preferably passing well beyond the free end 10 of the band.

In some cases the resiliency of the metal of this band will be sufficient to permit its being placed over wheels having a certain variation in diameter and will hold the device in position. In other cases where either a great amount of tolerance is required or where harder surface conditions are anticipated, fastening and clamping means are employed. A form of such clamping means which I have found practicable in use is illustrated in Figure 2 and comprises a set screw 15 which enters a tapped hole passing through not only the rim 5 but also the end 13 of the inner member where this passes beyond the free end of the band 10, the head 16 of the screw being adapted to engage this free end 10. After the adjustment is effected the locknut 17 is turned into locking position.

From the foregoing it will be apparent that when one desires to apply the device to the wheel 7 of the lawn mower the set screw 15 will be released, that is, by releasing the locknut 17 and turning the screw down bringing the head 16 well out of the way of the outward movement of the free end 10 of the inner member. The device may then readily be placed upon the wheel 7, the portions 8, 9 and 10 resiliently engaging the wheel whereupon the set screw will be turned up pressing the head 16 with sufficient force against the end portion 10. After sufficient adjustment has been accomplished the set screw 17 will be turned down. By this means the wheel 7 will have an enlarged diameter over the diameter of the wheel 18 so that the body 19 with the lawn mower will be enabled to properly perform its function in relation to the lawn 20 when the enlarged wheel is running on a lower surface such as the sidewalk surface 21.

Although this invention has been described in connection with the details shown in the drawing, and as it applies to enlarging one wheel of a device, yet it is to be apparent that changes may be made in construction as occasion demands and that such changes may be made within the scope of the claims without departing from the spirit of my invention.

Having described my invention, I claim and desire to secure by Letters Patent:

1. The combination with a continuous substantially inexpansible rim provided upon its perimeter with a tractive surface, of a band of elastic material within the rim having portions bent outwardly and engaging the inner side of the rim and portions bent inwardly and constructed and adapted to directly engage the rim of the wheel to which the device is to be applied, and means constructed and adapted for tightening such band against the rim of such wheel.

2. The combination with a rim, of a band of resilient material secured at one end to the inside of such rim and having portions bent inwardly for engaging the perimeter of the wheel to which the device is to be applied, one of such portions comprising the free end of the band, and such band being bent outwardly and attached to the rim.

3. The combination with a rim, of a band of resilient material secured at one end to the inside of such rim and having portions bent inwardly for engaging the perimeter of the wheel to which the device is to be applied, one of such portions comprising the free end of the band, and such band being bent outwardly and attached to the rim, there being a tapped hole formed through the rim and the end of the band mounted upon it, and a set screw located in such tapped hole and having its head engaging the free end of the band.

Signed at Cranford, N. J. this 14th day of November, 1929.

JARVIS E. BADGLEY.